No. 828,557. PATENTED AUG. 14, 1906.
C. G. LEVISON.
FISHING ROD.
APPLICATION FILED MAR. 21, 1906.
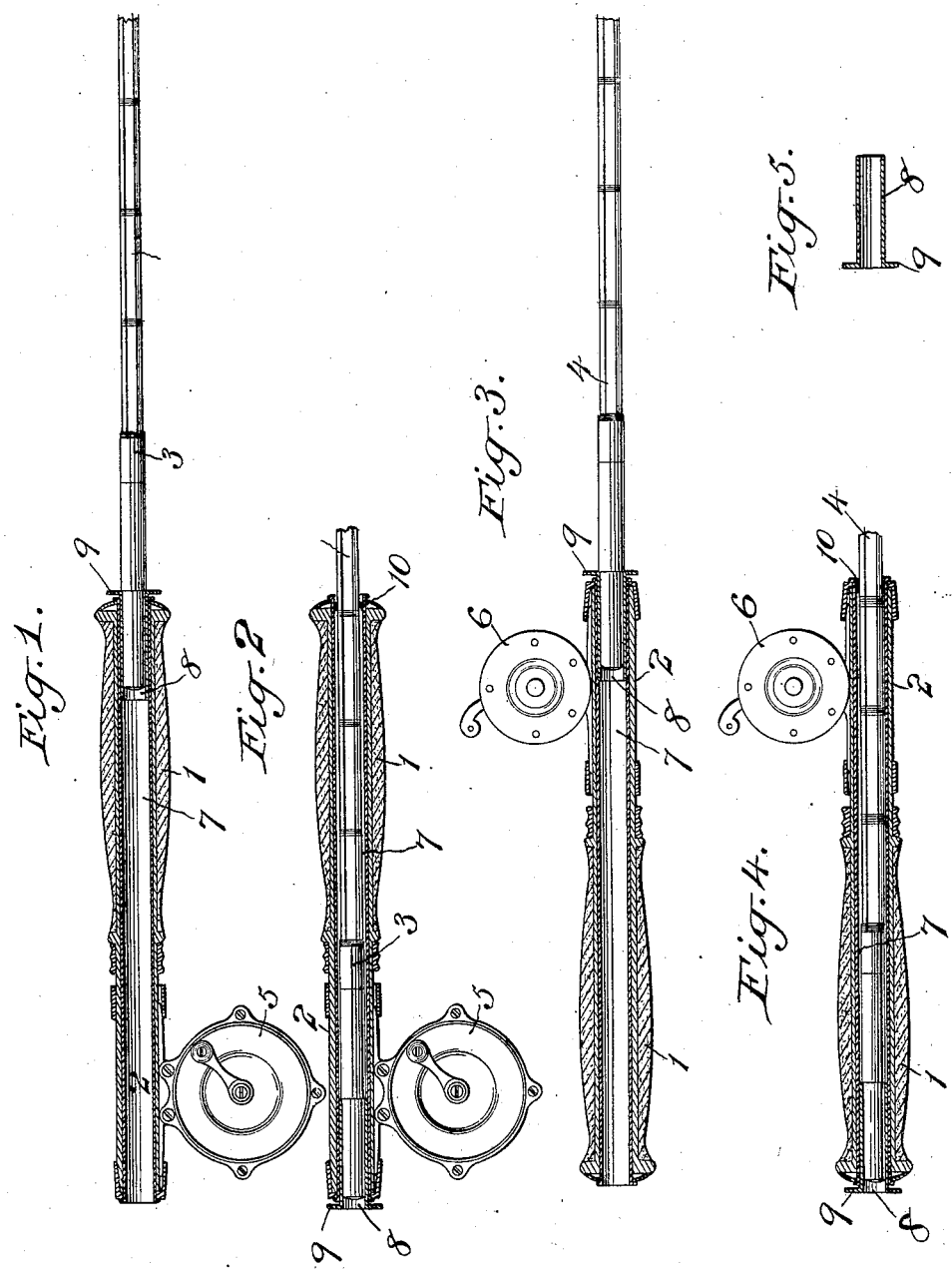
Witnesses:-
F. George Barry,
Henry Thieme
Inventor:
Chancellor G. Levison
by attorneys
Brown & Seward

UNITED STATES PATENT OFFICE.

CHANCELLOR G. LEVISON, OF NEW YORK, N. Y., ASSIGNOR TO EDWARD F. PAYNE, OF HIGHLAND MILLS, NEW YORK.

FISHING-ROD.

No. 828,557.

Specification of Letters Patent.

Patented Aug. 14, 1906.

Application filed March 21, 1906. Serial No. 307,161.

*To all whom it may concern:*

Be it known that I, CHANCELLOR G. LEVISON, a citizen of the United States, and a resident of the borough of Brooklyn, in the city and State of New York, have invented a new and useful Improvement in Fishing-Rods, of which the following is a specification.

The object of this invention is to provide an improvement in fishing-rods in which one handle is adapted for use in connection with a fly-rod or a bait-rod at pleasure, the fly-rod or the bait-rod being capable of adjustment to two different lengths to suit different requirements.

With this object in view my invention contemplates a handle having a longitudinal bore therethrough and a thimble which may be removably inserted into either end of the handle and which will serve to secure a bait-rod section or a fly-rod section in either end of the handle with the rod-section extending through the handle or in the opposite direction, as desired.

In the accompanying drawings, Figure 1 represents the handle in longitudinal central section in connection with a fly-rod section, the fly-rod section being removably secured to the end of the handle farthest away from the point where the reel is attached. Fig. 2 is a similar view showing the fly-rod section removably secured to the end of the handle adjacent to the reel with the fly-rod section extending through the handle. Fig. 3 is a similar view showing the handle used in connection with a bait-rod section, the bait-rod section being shown removably secured in the end of the handle adjacent to the reel. Fig. 4 is a similar view showing the bait-rod section removably secured in the end of the handle farthest away from the reel, said section extending through the handle; and Fig. 5 is a detail sectional view of the removable thimble for securing the rod-section in the handle.

The fishing-rod handle comprises a grip portion 1 and an extension 2, on which the reel is clamped, as is usual.

In Figs. 1 and 2 I have shown the grip portion 1 of the handle in front of the reel, and in Figs. 3 and 4 I have shown the grip portion of the handle back of the reel.

In Figs. 1 and 2 the handle is shown in connection with a fly-rod section 3, and in Figs. 3 and 4 the handle is shown in connection with a bait-rod section 4.

The reel for use with the handle and fly-rod section is denoted by 5, and the reel for use with the handle and bait-rod section is denoted by 6. The handle has a bore 7 extending longitudinally therethrough. A hollow thimble 8 is fitted to be removably inserted into either end of the handle, which thimble is provided with a flange 9 for use in inserting and removing the same. The inner ends of the fly and bait rod sections 3 and 4 are of such diameter that they may be forced into the bore of the thimble 8 from either end thereof and will be frictionally held in the said thimble. Furthermore, the fly-rod and bait-rod sections 3 and 4 are sufficiently small in cross-section to permit the said rods to be extended through the bore 7 of the handle.

When the handle is to be used in connection with a fly-rod, the thimble 8 may be inserted into the end of the handle adjacent to its grip portion 1 and the end of the fly-rod section 3 forced into the thimble. This will result in a fly-fishing rod of a certain length. If it is desired to shorten the length of the fishing-rod for use in cramped quarters, the rod-section 3 may be removed from the thimble. The thimble may then be removed from the end of the handle adjacent to its grip portion and reversed and inserted into the end of the handle adjacent to the reel extension. The fly-rod section 3 may then be inserted into the bore 7 from the end adjacent to the grip portion of the hand 1 until the end of the fly-rod section is forced into firm engagement with the thimble at the other end of the handle. This will shorten the length of the rod about the length of the handle. When it is desired to use the handle in connection with a bait-rod, the fishing-rod may be made of a predetermined length by inserting the thimble 8 into the end of the handle adjacent to the reel extension and then forcing the end of the bait-rod section 4 into the thimble inwardly from its outer end. If it is desired to make the rod shorter, it may be accomplished by withdrawing the bait-rod section from the thimble and then withdrawing the thimble and reversing the same and forcing it into the end of the handle adjacent to the grip portion thereof. The bait-rod 4 may then be inserted into the bore 7 from the end of the handle adjacent to the reel extension and forcing the end of the bait-rod section into the thimble 8 from its inner end. This will shorten the length of the bait-rod about the length of the handle. It will thus be seen that by the use of a single removable thimble I am enabled to provide a handle which will be suitable for use both in connection with fly-rods and bait-rods and in which both the fly-rod and the bait-rod are capable of being adjusted to two different lengths.

If desired, both the fly-rod section 3 and the bait-rod section 4 may be provided with a rubber gasket 10, which will be forced between the section and the bore of the handle when the section is extended through the bore into engagement with the thimble at the rear end of the handle.

What I claim is—

1. A fishing-rod section, a handle and means for removably securing the rod-section in either end of the handle with the rod-section extending in one or the opposite direction at pleasure.

2. A fishing-rod section, a handle and means for removably securing the rod-section in one end of the handle with the rod-section extending in one or the opposite direction or in the other end of the handle in one or the opposite direction at pleasure.

3. A fishing-rod section, a handle having a bore extending longitudinally therethrough and a thimble for removably securing the rod-section in one end of the handle with the rod-section extending in one direction through the handle or in the opposite direction at pleasure.

4. A fishing-rod section, a handle having a bore extending longitudinally therethrough and a thimble arranged to be removably inserted into either end of the handle for securing the rod-section in either end of the handle with the rod-section extending in one direction through the handle or the opposite direction at pleasure.

In testimony that I claim the foregoing as my invention I have signed my name, in presence of two witnesses, this 14th day of March, 1906.

CHANCELLOR G. LEVISON.

Witnesses:
FREDK. HAYNES,
HENRY THIEME.